(12) United States Patent
Hofmann et al.

(10) Patent No.: US 12,496,698 B2
(45) Date of Patent: Dec. 16, 2025

(54) POWER TOOL, ARRANGEMENT, METHOD, COMPUTER PROGRAM PRODUCT AND COMPUTER-READABLE MEDIUM

(71) Applicant: Festool GmbH, Wendlingen (DE)

(72) Inventors: Tobias Hofmann, Kirchheim/Teck (DE); Michael Thüringer, Großbettlingen (DE); Michal Calta, Česká Lípa (CZ)

(73) Assignee: Festool GmbH, Wendlingen (DE)

( * ) Notice: Subject to any disclaimer, the term of this patent is extended or adjusted under 35 U.S.C. 154(b) by 169 days.

(21) Appl. No.: 18/415,065

(22) Filed: Jan. 17, 2024

(65) Prior Publication Data
US 2024/0246217 A1    Jul. 25, 2024

(30) Foreign Application Priority Data
Jan. 20, 2023 (DE) ...................... 10 2023 101 433.1

(51) Int. Cl.
*B25F 5/00* (2006.01)
(52) U.S. Cl.
CPC ...................... *B25F 5/00* (2013.01)
(58) Field of Classification Search
CPC . B25F 5/00; H02K 7/145; H02P 21/22; H02P 7/00; H02P 27/08; H02P 6/157; H02P 6/14
See application file for complete search history.

(56) References Cited

U.S. PATENT DOCUMENTS 8,098,035 B2 * 1/2012 Sekimoto ................ H02P 29/50
    318/434
2023/0412101 A1   12/2023  Thurninger et al.
2023/0412103 A1   12/2023  Thurninger et al.

FOREIGN PATENT DOCUMENTS

| | | |
|---|---|---|
| DE | 10 2020 214 108 | 5/2022 |
| JP | 10-150795 | 6/1998 |
| WO | 2022/101019 | 5/2022 |
| WO | 2022/101020 | 5/2022 |

* cited by examiner

*Primary Examiner* — Said Bouziane
(74) *Attorney, Agent, or Firm* — HSML P.C.

(57) ABSTRACT

A power tool, in particular a hand-held power tool, for example a polishing device, a grinding device, a sawing device and/or a router, with a tool, an electric motor for driving the tool and a control unit for controlling the electric motor, in which the power tool is designed for connection to an AC supply voltage and includes a rectifier arrangement with an intermediate circuit for providing an intermediate circuit voltage on the basis of the AC supply voltage. The intermediate circuit voltage has a plurality of successive voltage half-waves, and in which the control unit is configured to calculate, for each voltage half-wave, a respective torque half-wave for controlling the electric motor, the control unit being configured to sample each voltage half-wave in order to obtain a plurality of voltage half-wave values, and to convert each voltage half-wave value into a respective torque half-wave value in order to calculate the respective torque half-wave.

21 Claims, 4 Drawing Sheets

POWER TOOL, ARRANGEMENT, METHOD, COMPUTER PROGRAM PRODUCT AND COMPUTER-READABLE MEDIUM

This application claims priority to German application 10 2023 101 433.1 filed Jan. 20, 2023, which is incorporated by reference.

The invention relates to a power tool, in particular a hand-held power tool, for example a polishing device, a grinding device, a sawing device and/or a router, with a tool, an electric motor for driving the tool and a control unit for controlling the electric motor, wherein the power tool is designed for connection to an AC supply voltage and comprises a rectifier arrangement with an intermediate circuit for providing an intermediate circuit voltage on the basis of the AC supply voltage, wherein the intermediate circuit voltage has a plurality of successive voltage half-waves, and wherein the control unit is configured to calculate, for each voltage half-wave, a respective torque half-wave for driving the electric motor.

The AC supply voltage is, for example, a mains voltage and/or an AC voltage generated by a generator. The intermediate circuit is, for example, a capacitor, which is used in particular to smooth the rectified AC supply voltage. There are various approaches to dimensioning the intermediate circuit. A first approach is to dimension the intermediate circuit so large that the intermediate circuit voltage is almost constant during a mains half-wave. In particular, this enables phase currents with constant effective values during a mains half-wave and/or with constant amplitude for the current supply to the electric motor and a resulting almost constant torque curve of the electric motor. However, a large intermediate circuit can lead to a poor power factor and high harmonic components in the pick-up current. A second approach is to dimension the intermediate circuit small so that the intermediate circuit voltage follows the AC supply voltage, in particular the rectified AC supply voltage. However, such a small intermediate circuit can have the consequence that with conventional control of the electric motor, areas can occur in which the induced counter voltage of the electric motor is greater than or equal to the intermediate circuit voltage and no current can flow into the motor. This behavior can lead to a torque ripple with twice the mains frequency. Furthermore, the ohmic power loss in the motor windings can be greater with a small intermediate circuit, so that the electric motor must be designed larger.

WO 2022/101019 A1 describes the approach of using a waveform profile stored in advance in a control unit (which waveform profile defines a trapezoidal waveform, for example) to provide a respective torque half-wave for each voltage half-wave for controlling the electric motor, the waveform of which torque half-wave is flattened compared to the waveform of the voltage half-wave. The minima of the torque curve formed from the torque half-waves can be synchronized with the zero crossings of the mains voltage.

From WO 2022/101020 A2, the approach is known to determine a countervoltage induced in the electric motor and to reduce a current torque value of the torque curve in response to the fact that the countervoltage is greater than or equal to the intermediate circuit voltage.

SUMMARY OF THE INVENTION

It is an object of the invention to provide an improved power tool.

The problem is solved by a power tool according to claim 1. The control unit of the power tool is configured to sample each voltage half-wave to obtain a plurality of voltage half-wave values, and to convert each voltage half-wave value into a respective torque half-wave value to calculate the respective torque half-wave.

According to the invention, each voltage half-wave in particular is thus converted value-for-value into a respective torque half-wave. In this way, it can be achieved in particular that each torque half-wave is in phase with the respective underlying voltage half-wave, in particular without having to recognize the phase position of the voltage half-wave for this purpose. For example, the control unit maps the voltage half-wave values, in particular monotonically, to the torque half-wave values, so that the basic shape of the waveform—and thus in particular the phase position—of the voltage half-waves is expediently adopted for the torque half-waves.

In particular, if the AC supply voltage is distorted, for example if the AC supply voltage is generated by a generator, in particular a diesel generator, it can be problematic to recognize the phase position of the voltage half-wave, for example on the basis of the zero crossing. By the approach according to the invention of converting each voltage half-wave value-for-value into the respective torque half-wave, the phase position of each voltage half-wave is automatically or "by itself" adopted for the respective torque half-wave, so that expediently no zero crossing has to be detected (and in particular is not detected) and thus the susceptibility to errors can be reduced in relation to a distorted supply AC voltage.

Advantageous further developments are the subject of the dependent claims.

The invention further relates to an arrangement comprising a generator, in particular a combustion generator, and the power tool, wherein the generator is designed to provide the AC supply voltage.

The invention further relates to an arrangement comprising a transformer and the power tool, wherein the transformer is designed to provide the AC supply voltage.

The invention further relates to a method for operating a power tool, in particular a hand-held power tool, for example a polishing device, grinding device, sawing device and/or router, with a tool, an electric motor for driving the tool and a control unit for controlling the electric motor, comprising the steps:

providing, by means of a rectifier arrangement with an intermediate circuit, an intermediate circuit voltage based on an AC supply voltage to which the power tool is connected, the intermediate circuit voltage having a plurality of successive voltage half-waves, for each voltage half-wave, calculating a respective torque half-wave for driving the electric motor, wherein each voltage half-wave is sampled to obtain a plurality of voltage half-wave values, and each voltage half-wave value is converted to a respective torque half-wave value to calculate the respective torque half-wave.

The invention also relates to a computer-readable medium on which a computer program product is stored, the computer program product comprising instructions that cause the power tool to perform the method steps of the method.

Further exemplary details and exemplary embodiments are explained below with reference to the figures. Thereby shows

BRIEF DESCRIPTION OF THE DRAWINGS

FIG. 1 a schematic representation of a power tool designed as a polishing device, FIG. 2 a schematic representation of a power tool designed as a saw, FIG. 3 a schematic representation of the rectifier arrangement, the control unit and the electric motor of the power tool, FIG. 4 a block diagram of signal processing, FIG. 5 a block diagram of a torque curve calculation unit, FIG. 6 a diagram with a torque curve, a time curve of an intermediate circuit voltage, a lower limit and an upper limit, and FIG. 7 a diagram showing the intermediate circuit voltage over time and two different waveform profiles.

DETAILED DESCRIPTION OF THE INVENTION

Figure 1:
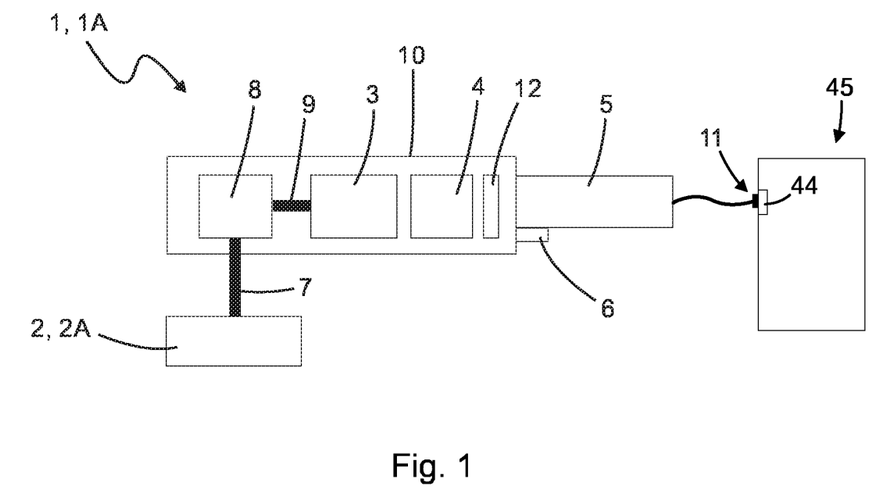
Figure 2:
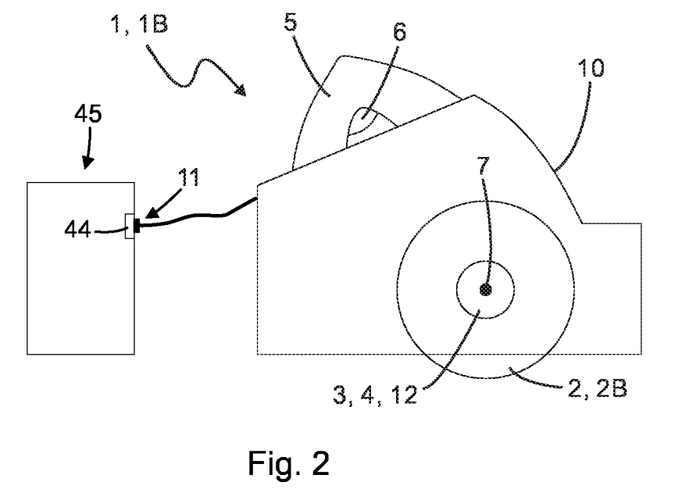

FIGS. 1 and 2 show exemplary designs of a power tool 1. Exemplarily, the power tool 1 is designed as a hand-held power tool. The power tool 1 can be gripped, carried and/or guided manually by a user. In particular, the power tool 1 can be designed as a polishing device 1A (see FIG. 1) or as a sawing device 1B (see FIG. 2). The polishing device 1A is, for example, a polishing machine, in particular a rotary polisher. The sawing device 1B is, for example, a plunge saw. Alternatively, the power tool 1 can also be designed as another power tool, for example as a sander, in particular as a renovation sander, or as a router.

The power tool 1 comprises a tool 2. The tool 2 is exemplarily designed as a polishing disk 2A or as a saw blade 2B. Alternatively, the tool 2 can also be designed as another tool, for example as a sanding disc. The tool 2 is used in particular to machine a workpiece, especially in a state in which the tool 2 is set into a working movement, in particular a rotary movement, by an electric motor 3.

The power tool 1 comprises the electric motor 3 for driving the tool 2. In particular, the electric motor 3 is designed to provide the rotary drive movement on the basis of which the tool 2 is driven. The electric motor 3 is designed, for example, as an EC motor, i.e. an electronically commutated motor. The electric motor 3 is in particular a brushless motor, preferably a brushless DC motor, BLDC motor.

The power tool 1 also comprises a control unit 4 for controlling the electric motor 3. The control unit 4 comprises, for example, a microcontroller and/or power electronics. To control the electric motor 3, the control unit 4 is in particular designed to supply the electric motor 3 with several motor currents I1, I2, I3, which are in particular phase-shifted with respect to one another, in order to expediently cause the electric motor 3 to perform the rotary drive movement. The motor currents I1, I2, I3 can also be referred to as phase currents. The control unit 4 expediently has an inverter for providing the motor currents I1, I2, I3.

As an example, the power tool 1 further comprises a handle 5 with which a user can manually grip, carry and/or guide the power tool 1. The power tool 1 further comprises an operating device 6, for example a button and/or a switch, via which the user can control the drive of the tool 2, in particular start and/or stop it. As an example, the operating device 6 is arranged on the handle 5.

The power tool 1 expediently comprises a shaft 7, via which the tool 2 is coupled to the electric motor 3, so that the tool 2 can be driven by the electric motor 3. Optionally, the power tool 1 can comprise a gearbox, in particular an angular gearbox 8, via which the tool 2 is coupled to the electric motor 3. In FIG. 1, the power tool 1 comprises an exemplary coupling shaft 9, via which the electric motor 3 is coupled to the angular gearbox 8. As an example, the angular gear 8 is coupled to the tool 2 via the shaft 7. Alternatively, the electric motor 3 can be coupled directly to the tool 2, for example via the shaft 7.

As an example, the power tool 1 comprises an outer housing 10, in which the electric motor 3, the control unit 4 and/or a rectifier arrangement 12 is expediently arranged. As an example, the handle 5 is arranged on the outer housing 10. Alternatively, the handle 5 can be part of the outer housing 10.

Figure 3:
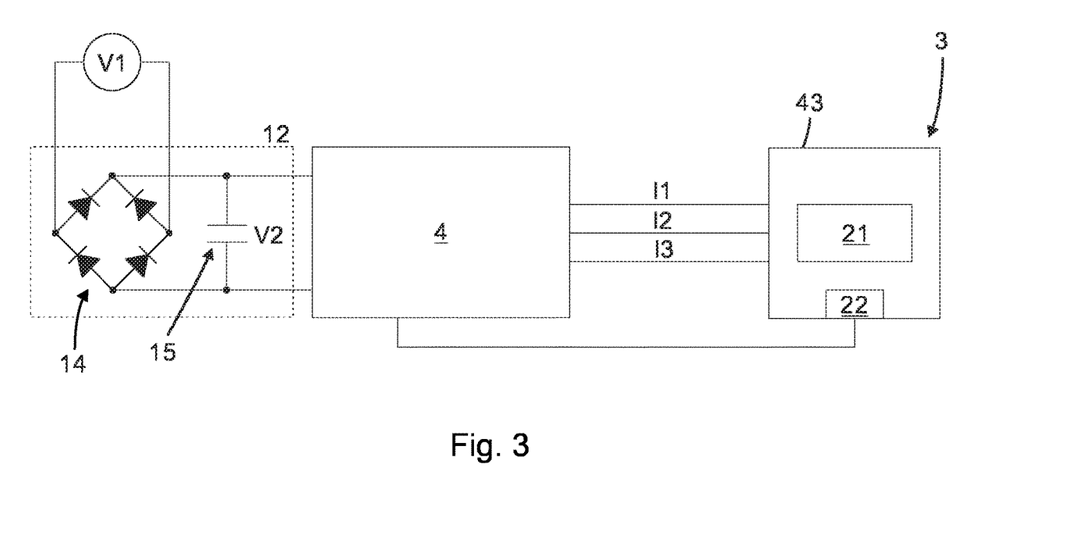

The power tool 1 is designed for connection to an AC supply voltage V1 (see FIG. 3). The AC supply voltage V1 is sinusoidal in particular and has an effective value of 230 V and/or a frequency of 50 Hz as an example. The AC supply voltage V1 can have the signal form of a distorted sinusoidal signal. Furthermore, the AC supply voltage V1 can have an effective value of 120 V and/or a frequency of 60 Hz. The power tool 1 comprises a connection 11, for example a mains plug and/or a mains plug connection, via which the power tool 1 can be connected to the AC supply voltage, for example to a socket 44.

By way of example, an arrangement comprising a generator 45 and the power tool 1 is provided, wherein the generator 45 is designed to provide the alternating supply voltage V1. The generator 45 is in particular a combustion generator, for example a gasoline generator or a diesel generator. As an example, the generator 45 has the socket 44 to which the power tool 1 is connected with the connection 11.

Optionally, an arrangement is provided that comprises a transformer and the power tool, whereby the transformer is designed to provide the AC supply voltage. As an example, the transformer has a socket to which the power tool 1 is connected with the connection 11. The transformer is, for example, an isolating transformer. Expediently, the transformer is designed to convert a mains voltage, for example 230 V AC, into the AC supply voltage V1, for example 110 V AC. Expediently, the transformer is connected to the mains voltage.

The power tool 1 has the rectifier arrangement 12, which is arranged in the outer housing 10 as an example. The rectifier arrangement 12 is shown, for example, in FIG. 3. The rectifier arrangement 12 is designed to provide an intermediate circuit voltage V2 on the basis of the AC supply voltage V1. The rectifier arrangement 12 comprises a rectifier 14, which is exemplarily designed as a bridge rectifier. The rectifier 14 expediently comprises four diodes, which are exemplarily connected as a bridge. The AC supply voltage V1 is fed to the rectifier 14, which provides a rectified AC supply voltage on the basis of the AC supply voltage V1. The rectifier arrangement 12 also comprises an intermediate circuit 15, which is exemplarily designed as a capacitor. The intermediate circuit 15 is connected to the output of the rectifier 14. The intermediate circuit 15 is used to smooth the rectified AC supply voltage. The smoothed rectified AC supply voltage is also referred to as intermediate circuit voltage V2. The intermediate circuit voltage V2 drops across the intermediate circuit 15, in particular across the capacitor.

The intermediate circuit 15, in particular the capacitor, is for example less than 100 µF, less than 50 µF, less than 30 µF, less than 20 µF or less than 10 µF.

The control unit 4 and/or the electric motor 3 are preferably supplied from the intermediate circuit 15. The control unit 4 is configured to generate motor currents I1, I2, I3 on the basis of the electrical energy provided by the intermediate circuit 15, in particular on the basis of the intermediate circuit voltage V2, and to supply them to the electric motor 3. As an example, the control unit 4 provides three motor currents I1, I2, I3. For example, a direct current flows from the intermediate circuit into the inverter, which generates the motor currents I1, I2, I3 from the direct current.

As an example, the electric motor 3 comprises a stator 43 and a rotor 21. The rotor 21 is coupled to the tool 2. By energizing the electric motor 3 with the motor currents I1, I2, I3, the rotor 21 is set into the drive rotary motion relative to the stator 43.

Optionally, the electric motor 3 has a position sensor device 22, which is used to detect the position and/or movement, in particular the current angle, of the rotor 21. The position sensor device 22 comprises, for example, a magnetic sensor, in particular a Hall sensor. The control unit 4 is expediently designed to detect the present angle of the rotor 21 using the position sensor device 22. The control unit 4 can be designed to detect the present speed of the electric motor 3 using the position sensor device 22. It is noted that the word "present" is used as a synonym for "current".

Alternatively or additionally, the control unit 4 can be designed to detect the present angle of the rotor 21 and/or the present speed of the electric motor 3 without sensors. In this case, it is expedient that no position sensor device 22 is present. In particular, the control unit 4 is designed to determine a countervoltage induced in the electric motor and to calculate the present angle of the rotor 21 and/or the present speed of the electric motor 3 on the basis of the countervoltage. In particular, the control unit 4 is designed to calculate the present angle of the rotor 21 and/or the present speed of the electric motor 3 by means of the back EMF, where "EMF" stands for "Electromotive Force".

Figure 4:
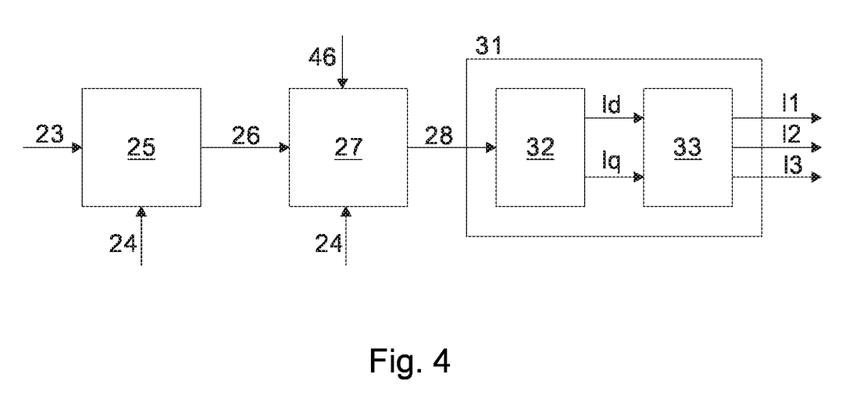

FIG. 4 shows an exemplary block diagram of the signal processing performed by the control unit 4 for controlling the electric motor 3.

The control unit 4 is expediently designed to perform a closed-loop rotational speed control of the electric motor 3. In particular, the control unit 4 is designed to provide the motor currents I1, I2, I3 on the basis of a target rotational speed 23 and an actual rotational speed 24. The target rotational speed 23 is set by the control unit 4, for example, according to a user input made with the operating device 6. Furthermore, the target rotational speed 23 can be stored in the control unit 4 in advance and/or calculated by the control unit 4. The actual rotational speed 24 is the present rotational speed of the electric motor 3 and is expediently obtained as described above—in particular by means of the position sensor device 22 and/or on the basis of a sensorless principle, in particular on the basis of the induced countervoltage. The actual rotational speed 24 describes how fast the rotor 21 rotates relative to the stator 43.

The control unit 4 comprises a closed-loop rotational speed controller 25, to which the target rotational speed 23 and the actual rotational speed 24 are fed. On the basis of the target rotational speed 23 and the actual rotational speed 24, in particular on the basis of a comparison between the target rotational speed 23 and the actual rotational speed 24, the closed-loop rotational speed controller 25 calculates a torque setpoint 26. The torque setpoint 26 specifies the torque with which the rotor 21 is to be loaded by energizing the electric motor 3 in order to achieve a change in the actual rotational speed 24 towards the target rotational speed 23.

The control unit 4 also comprises a torque curve calculation unit 27, which is designed to calculate a torque curve 28 over time on the basis of the torque setpoint 26. The torque curve 28 can also be referred to as a torque signal. As an example, the torque curve calculation unit 27 calculates the torque curve 28 taking into account voltage half-wave values 46 and, in particular, the actual rotational speed 24.

The control unit 4 expediently supplies current to the electric motor 3 in proportion to the torque curve 28. If the torque curve 28 assumes larger values, the control unit 4 increases the current supply to the electric motor 3. The control unit 4 comprises a motor current provision unit 31, which is designed to calculate the motor currents I1, I2, I3 on the basis of the torque curve 28. As an example, the motor current provision unit 31 comprises a target current specification unit 32, which is designed to calculate a q-current and a d-current, in particular on the basis of the torque curve 28. The d-current and the q-current are currents in a rotor-related d/q-system, which rotates according to the rotation of the rotor 21. The d-current represents the flux-forming component and the q-current represents the torque-forming component. The d-current may be referred to as the d-component or field-weakening current and the q-current may be referred to as the q-component or torque-forming current. The target current specification unit 32 calculates the q-current and the d-current in such a way as to achieve the torque curve 28 when the electric motor 3 is energized in accordance with the q-current and the d-current. As an example, the time curve of the calculated q-current corresponds to the torque curve 28. In particular, the q-current has the same curve shape as the torque curve 28.

The motor current provision unit 31 expediently comprises a closed-loop current controller 33, which is designed to provide the motor currents I1, I2, I3. In particular, the closed-loop current controller 33 is designed to perform closed-loop current control of the motor currents I1, I2, I3. The motor currents I1, I2 and I3 are preferably pulse width modulated. The closed-loop current controller 33 provides the motor currents I1, I2, I3 on the basis of the q-current and the d-current, in particular by performing a transformation from a two-axis coordinate system to a three-axis coordinate system. The current controller 33 provides the motor currents I1, I2, I3 in such a way that the calculated q-current and the calculated d-current are achieved. The electric motor 3, in particular the motor windings of the stator 43, is energized with the motor currents I1, I2, I3. As an example, the rotor 21 has a permanent magnet and is set in rotary motion by an interaction of the permanent magnet with the magnetic field generated by the energization of the motor windings.

Figure 5:
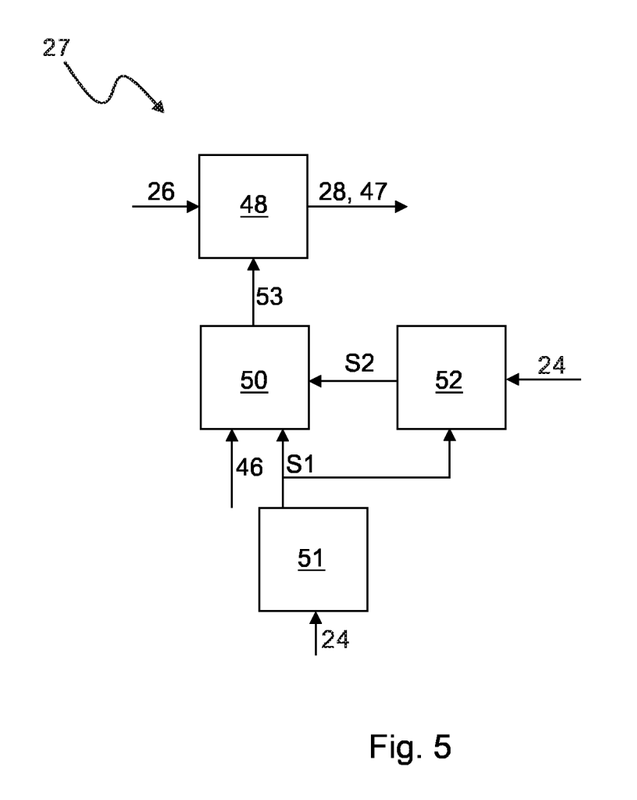

FIG. 5 shows an exemplary embodiment of the torque curve calculation unit 27. The torque curve calculation unit 27 calculates a plurality of torque half-wave values 47, which together form the torque curve 28. As an example, the torque curve calculation unit 27 has a multiplication unit 48 which multiplies a respective torque setpoint 26 by a respective waveform profile value 53 of a waveform profile 49 to calculate each torque half-wave value 47 of the torque curve 28. The waveform profile 49 may also be referred to as a waveform signal. The torque profile calculation unit 27 further comprises a waveform profile calculation unit 50 which converts each voltage half-wave value 46 (of the intermediate circuit voltage V2) into a respective waveform profile value 53, expediently taking into account a respective lower limit S1 and/or a respective upper limit S2. The torque curve calculation unit 27 has a lower limit calculation unit 51 which calculates a respective lower limit S1 on the basis of a respective actual rotational speed 24. The torque curve calculation unit 27 has an upper limit calculation unit 52, which calculates a respective upper limit S2 on the basis of the respective lower limit S1 and the respective actual rotational speed 24.

Figure 6:
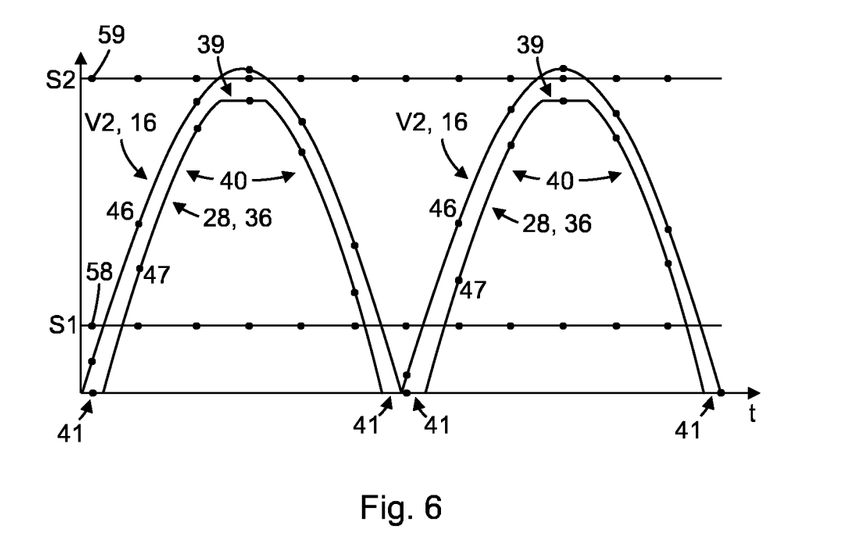

FIG. 6 shows exemplary time curves of the intermediate circuit voltage V2, the lower limit S1 and the upper limit S2, as well as the torque curve 28.

The intermediate circuit voltage V2 comprises a plurality of successive voltage half-waves 16. As an example, the voltage half-waves 16 each have the waveform of a sine half-wave. The voltage half-waves 16 can each have the waveform of a distorted sine half-wave. As an example, the intermediate circuit voltage V2 follows the rectified AC supply voltage V1 and/or drops to zero in minima of the intermediate circuit voltage V2.

The term "half-wave" refers in particular to a curve shape that starts from a minimum, for example zero, to a maximum and runs from the maximum back to the minimum. In particular, a half-wave shall be defined as a periodically repeated curve shape that expediently does not contain a change of sign.

According to an optional embodiment (not shown in FIGS. 6 and 7), the minima of the voltage half-waves can be greater than zero.

The torque curve 28 has a plurality of successive torque half-waves 36. As an example, the torque half-waves 36 each have the curve shape of a (in particular truncated) half-wave, for example a (in particular truncated) sine half-wave. The torque half-waves 36 can each have the curve shape of a (in particular truncated) distorted sine half-wave. In particular, a truncated half-wave is a curve shape in which the maximum is formed by a constant plateau section—i.e. in particular a signal section with the shape of a straight line with a slope of zero. A truncated sine half-wave is therefore a sine half-wave whose maximum is truncated.

As an example, each torque half-wave 36 has a respective plateau section 39, which represents the maximum of the torque half-wave 36. In the plateau section 39, the torque half-wave 36 is preferably constant and in particular has the shape of a straight line. Each torque half-wave 36 expediently also has two minimum sections 41, which expediently represent the minima of the torque half-wave 36. In the minimum sections 41, the torque half-wave 36 is expediently constant, in particular equal to zero, and in particular has the form of a straight line. Each torque half-wave 36 expediently also has two flank sections 40, which surround the plateau section 39. As an example, a first flank section 40 of each torque half-wave 36 extends (in particular strictly monotonically) ascendingly from a first minimum section 41 to the plateau section 39 and a second flank section 40 of each torque half-wave 36 extends (in particular strictly monotonically) descendingly from the plateau section 39 to a second minimum section 41.

Each torque half-wave 36 thus comprises the following sections, which follow one another in time in the following sequence, in particular directly after one another: a first minimum section 41 (preferably equal to zero), a first flank section 40 (preferably with a positive slope), the plateau section 39 (preferably with a slope of zero), a second flank section 40 (preferably with a negative slope) and a second minimum section 41 (preferably equal to zero).

The control unit 4 is expediently designed to provide each torque half-wave 36 with a period equal to the period of a respective voltage half-wave 16. Preferably, the frequency of the torque curve 28 is twice as high as the frequency of the supply AC voltage V1. For example, the frequency of the torque curve 28 is 100 Hz or 120 Hz.

The lower limit S1 and the upper limit S2 are expediently positive and, by way of example, are constant. The upper limit S2 is greater than the lower limit S1.

Figure 7:
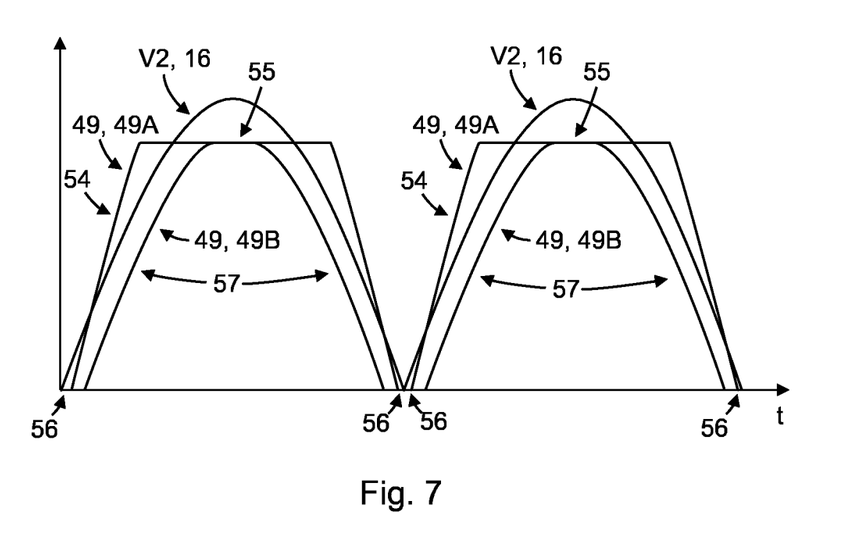

FIG. 7 shows an exemplary time curve of the intermediate circuit voltage V2, which is designed in particular like the time curve shown in FIG. 6. Furthermore, FIG. 7 shows two exemplary waveform profiles 49—namely a first waveform profile 49A and a second waveform profile 49B.

Each waveform profile 49 has a plurality of successive profile half-waves 54. As an example, the profile half-waves 54 each have the curve shape of a (in particular truncated) half-wave, for example a (in particular truncated) sine half-wave. The profile half-waves 54 can each have the curve shape of a (in particular truncated) distorted sine half-wave.

As an example, each profile half-wave 54 has a respective profile plateau section 55, which represents the maximum of the profile half-wave 54. In the profile plateau section 55, the profile half-wave 54 is preferably constant and in particular has the shape of a straight line.

Each profile half-wave 54 expediently also has two profile minimum sections 56, which expediently represent the minima of the profile half-wave 54. In the profile minimum sections 56, the profile half-wave 54 is expediently constant, in particular equal to zero, and in particular has the form of a straight line. Each profile half-wave 54 expediently also has two profile flank sections 57, which surround the profile plateau section 55. By way of example, a first profile flank section 57 of each profile half-wave 54 extends (in particular strictly monotonically) ascendingly from a first profile minimum section 56 to the profile plateau section 55 and a second profile flank section 57 of each profile half-wave 54 extends (in particular strictly monotonically) descendingly from the profile plateau section 55 to a second profile minimum section 56.

The control unit 4 is expediently designed to provide each profile half-wave 54 with a period equal to the period of a respective voltage half-wave 16. Preferably, the frequency of the waveform profile 49 is twice as high as the frequency of the supply AC voltage V1.

In the following, the calculation of the torque curve 28 will be described in more detail. The operations described below, which are carried out by the control unit 4, are preferably carried out by the torque curve calculation unit 27.

The control unit 4 is designed to calculate, for each voltage half-wave 16, a respective torque half-wave 36 for the control of the electric motor 3. The control unit 4 is designed to sample each voltage half-wave 16 in order to obtain a plurality of voltage half-wave values 46, and to convert each voltage half-wave value 46 into a respective torque half-wave value 47 in order to calculate the respective torque half-wave 36. For example, the control unit 4 has an analog-to-digital converter to sample each voltage half-wave 16. The calculated torque half-wave values 47 together form the torque curve 28. In FIG. 6, several exemplary voltage half-wave values 46 and torque half-wave values 47 are drawn as points. For the sake of better visualization, only a small number of voltage half-wave values 46 and torque half-wave values 47 have been drawn. Preferably, more voltage half-wave values 46 are sampled per voltage half-wave 16 than shown in FIG. 6 and, expediently, more torque half-wave values 47 are calculated per torque half-wave 36 than shown in FIG. 6.

In particular, the control unit 4 converts the voltage half-wave values 46 into the torque half-wave values 47 in such a way that each resulting torque half-wave 36 is in phase with the respective underlying voltage half-wave 16.

Expediently, the control unit 4 converts each voltage half-wave value 26 into a respective waveform profile value 53, and multiplies the respective waveform profile value 53 by the respective torque setpoint 26 to calculate the respective torque half-wave value 47. Preferably, the control unit 4 successively calculates a plurality of waveform profile values 53, which together form a waveform profile 49.

Preferably, the control unit 4, in particular the torque curve calculation unit 27, is designed to calculate the respective torque half-wave 47 taking into account a present rotational speed, for example the actual rotational speed 24, of the electric motor 3. In particular, the control unit 4 is designed to convert each voltage half-wave value 46 into a respective torque half-wave value 47, taking into account the present rotational speed, in particular the actual rotational speed 24. The word "present" is used as a synonym for "current".

For example, the control unit 4 is designed to calculate the respective torque half-wave 36 with a narrower waveform for a higher rotational speed (e.g. a higher actual rotational speed 24) than for a lower rotational speed (e.g. a lower actual rotational speed 24). By a narrower curve shape is meant that the curve shape (i.e. the torque half-wave 36) is greater than zero in a smaller time interval.

As an example, the control unit 4 achieves this rotational speed dependency of the waveform by means of a corresponding rotational-speed-dependent calculation of the waveform profile 49.

For example, the control unit 4 calculates the first waveform profile 49A for a first actual rotational speed (which is lower than a second actual rotational speed) and the second waveform profile 49B for the second actual rotational speed. In the first waveform profile 49A, the profile minimum sections 56 occupy a smaller proportion of the period of the waveform profile 49—i.e. a smaller proportion of the duration of a profile half-wave 54—than the profile minimum sections 56 of the second waveform profile 49B. Expediently, in the first waveform profile 49A, the profile plateau section 55 occupies a larger proportion of the period of the waveform profile—i.e. a larger proportion of the duration of a profile half-wave 54—than the profile plateau section 55 of the second waveform profile 49B. The two waveform profiles 49A, 49B expediently have the same period.

In particular, the control unit 4 is designed to lengthen the minimum sections 41 in time when the actual rotational speed 24 increases (in particular by lengthening the profile minimum sections 56 in time) and/or to shorten the plateau section 39 in time when the actual rotational speed 24 increases (in particular by shortening the profile plateau section 55 in time).

Preferably, the control unit 4 is designed to calculate the respective torque half-wave 36 with a higher maximum for a higher rotational speed (in particular a higher actual rotational speed 24) than for a lower rotational speed (in particular a lower actual rotational speed 24). A higher maximum refers in particular to a plateau section 39 with a higher value. The rotational speed dependency of the maximum results in particular from the fact that the control unit 4 calculates the torque setpoint 26 as part of the closed-loop rotational speed control as a function of the rotational speed.

The control unit 4, in particular the torque curve calculation unit 27, is preferably designed to calculate the lower limit S1 and/or the upper limit S2 and to calculate the respective torque half-wave 36 on the basis of the lower limit S1 and/or the upper limit S2. Preferably, the control unit 4 is designed to calculate the lower limit S1 and/or the upper limit S2 as a function of the present rotational speed (in particular the actual rotational speed 24) of the electric motor 3, so that the lower limit S1 and/or the upper limit S2 increases as the rotational speed increases.

Preferably, the control unit 4 is designed to compare the intermediate circuit voltage V2 (in particular a present voltage half-wave value 46) with the lower limit S1 and, in response to the fact that the intermediate circuit voltage V2 (in particular the present voltage half-wave value 46) is less than or equal to the lower limit S1, to set the respective torque half-wave value 47 to zero. As an example, the control unit 4 sets the respective torque half-wave value 47 to zero by the control unit 4 setting the respective waveform profile value 53 to zero. Expediently, the control unit 4 sets the torque curve 28 and/or the waveform profile 49 to zero in response to the fact that the intermediate circuit voltage V2 falls below the lower limit S1. As a result of the control unit 4 setting the torque curve 28 and/or the waveform profile 49 to zero, the control unit 4 generates a respective minimum section 41 and/or a respective profile minimum section 56.

Preferably, the control unit 4 is designed to compare the intermediate circuit voltage V2 (in particular a present voltage half-wave value 46) with the upper limit S2 and, in response to the fact that the intermediate circuit voltage V2 (in particular the current voltage half-wave value 46) is greater than or equal to the upper limit S2, to limit the respective torque half-wave value 47 to a torque half-wave maximum value. Expediently, the control unit 4 limits the respective torque half-wave value 47 in that the control unit 4 sets the respective waveform profile value 53 to a maximum waveform profile value (for example to 1). By the control unit 4 limiting the maximum of the torque curve 28 and/or the waveform profile 49, the control unit 4 generates a respective plateau section 39 and/or a respective profile plateau section 55.

Preferably, the control unit 4 is designed to calculate a respective present lower limit value 58 and a respective present upper limit value 59 for the calculation of each torque half-wave value 47. In FIG. 6, the lower limit values 58 and the upper limit values 59 are shown as dots. The word "present" is used as a synonym for "current".

Preferably, the control unit 4 is designed to calculate the respective present lower limit value 58 and/or the respective present upper limit value 59 as a function of a/the present rotational speed (in particular the actual rotational speed 24) of the electric motor 3. As an example, the dependency between the respective present lower limit value 58 and/or the respective present upper limit value 59 and the present rotational speed is such that a higher lower limit value 58 and/or a higher upper limit value 59 is calculated for a higher present rotational speed.

Preferably, the control unit 4 is designed to calculate the respective torque half-wave value 47 as the product of the torque setpoint 26 with the respective waveform profile value 53. Expediently, the control unit 4 is designed to calculate the waveform profile value 53 as a quotient of a difference between the respective voltage half-wave value 46 and the lower limit S1 and the difference between the upper limit S2 and the lower limit S1, i.e. in particular as KPW=(SHW−S1)/(S2−S1), where KPW is the waveform profile value 53 and SHW is the voltage half-wave value 46.

In particular, the power tool 1 can be operated according to a method comprising the steps:

providing, by means of the rectifier arrangement 12 with an intermediate circuit 15, the intermediate circuit voltage V2 on the basis of the supply AC voltage V1 to which the power tool 1 is connected, the intermediate circuit voltage V2 having a plurality of successive voltage half-waves 16, for each voltage half-wave 16, calculating a respective torque half-wave 36 for driving the electric motor 3, wherein each voltage half-wave 16 is sampled to obtain a plurality of voltage half-wave values 46, and each voltage half-wave value 46 is converted to a respective torque half-wave value 47 to calculate the respective torque half-wave 47.

Expediently, the method comprises a further step in which the electric motor 3 is energized in accordance with the torque half-waves 36, so that the rotor 21 is set into the drive rotary movement and thereby the tool 2 is set into the working movement.

Expediently, the method comprises a further step in which a workpiece is processed, in particular polished, ground or sawn, using the tool 2.

The invention claimed is:

1. A power tool having a tool, an electric motor for driving the tool and a control unit for controlling the electric motor, wherein the power tool is designed for connection to an AC supply voltage and comprises a rectifier arrangement with an intermediate circuit for providing an intermediate circuit voltage on the basis of the AC supply voltage, wherein the intermediate circuit voltage has a plurality of successive voltage half-waves, and wherein the control unit is configured to calculate, for each voltage half-wave, a respective torque half-wave for controlling the electric motor, the control unit being configured to sample each voltage half-wave in order to obtain a plurality of voltage half-wave values, and to convert each voltage half-wave value into a respective torque half-wave value in order to calculate the respective torque half-wave.

2. The power tool according to claim 1, wherein the control unit is configured to calculate the respective torque half-wave taking into account a present rotational speed of the electric motor.

3. The power tool according to claim 2, wherein the control unit is configured to convert each voltage half-wave value into a respective torque half-wave value, taking into account the present rotational speed.

4. The power tool according to claim 2, wherein the control unit is configured to calculate the respective torque half-wave with a narrower curve shape for a higher rotational speed than for a lower rotational speed.

5. The power tool according to claim 2, wherein the control unit is configured to calculate the respective torque half-wave with a higher maximum for a higher rotational speed than for a lower rotational speed.

6. The power tool according to claim 1, wherein the control unit is configured to calculate a lower limit and/or an upper limit and to calculate the respective torque half-wave on the basis of the lower limit and/or the upper limit.

7. The power tool according to claim 6, wherein the control unit is configured to calculate the lower limit and/or the upper limit as a function of a present rotational speed of the electric motor, so that the lower limit and/or the upper limit increases as the rotational speed increases.

8. The power tool according to claim 6, wherein the control unit is configured to compare the intermediate circuit voltage with the lower limit and, in response to the intermediate circuit voltage being less than or equal to the lower limit, to set the respective torque half-wave value to zero.

9. The power tool according to claim 6, wherein the control unit is configured to compare the intermediate circuit voltage with the upper limit and, in response to the intermediate circuit voltage being greater than or equal to the upper limit, to limit the respective torque half-wave value to a torque half-wave maximum value.

10. The power tool according to claim 6, wherein the control unit is configured to calculate a respective present lower limit value and a respective present upper limit value for the calculation of each torque half-wave value.

11. The power tool according to claim 10, wherein the control unit is configured to calculate the respective present lower limit value and/or the respective present upper limit value as a function of a present rotational speed of the electric motor.

12. The power tool according to claim 11, wherein the dependency between the respective present lower limit value and/or the respective present upper limit value and the present rotational speed is such that a higher lower limit value and/or a higher upper limit value is calculated for a higher present rotational speed.

13. The power tool according to claim 10, wherein the control unit is configured to calculate the respective torque half-wave value as a product of a torque setpoint with a respective curve profile value.

14. The power tool according to claim 13, wherein the control unit is configured to calculate the respective curve profile value as a quotient of a difference between the respective voltage half-wave value and the lower limit and a difference between the upper limit and the lower limit.

15. An arrangement comprising a generator and a power tool according to claim 1, wherein the generator is designed to provide the alternating supply voltage.

16. The arrangement according 15, wherein the generator is a combustion generator.

17. An arrangement comprising a transformer and a power tool according to claim 1, wherein the transformer is designed to provide the supply AC voltage.

18. The power tool according to claim 1, wherein the power tool is a hand-held power tool.

19. The power tool according to claim 1, wherein the power tool is a polishing device, grinding device, sawing device and/or a router.

20. A method for operating a power tool having a tool, an electric motor for driving the tool and a control unit for controlling the electric motor, comprising the steps of:

providing, by means of a rectifier arrangement with an intermediate circuit, an intermediate circuit voltage on the basis of a supply AC voltage to which the power tool is connected, the intermediate circuit voltage having a plurality of successive voltage half-waves, for each voltage half-wave, calculating a respective torque half-wave for driving the electric motor, wherein each voltage half-wave is sampled to obtain a plurality of voltage half-wave values, and each voltage half-wave value is converted into a respective torque half-wave value to calculate the respective torque half-wave.

21. A computer-readable medium on which a computer program product is stored, the computer program product comprising instructions, which when executed by a processor, cause a power tool to perform the method steps of the method according to claim 20.

* * * * *